Feb. 2, 1932.  C. W. VAN RANST  1,843,146
FRONT WHEEL DRIVEN AUTOMOBILE
Filed May 31, 1929  4 Sheets-Sheet 4
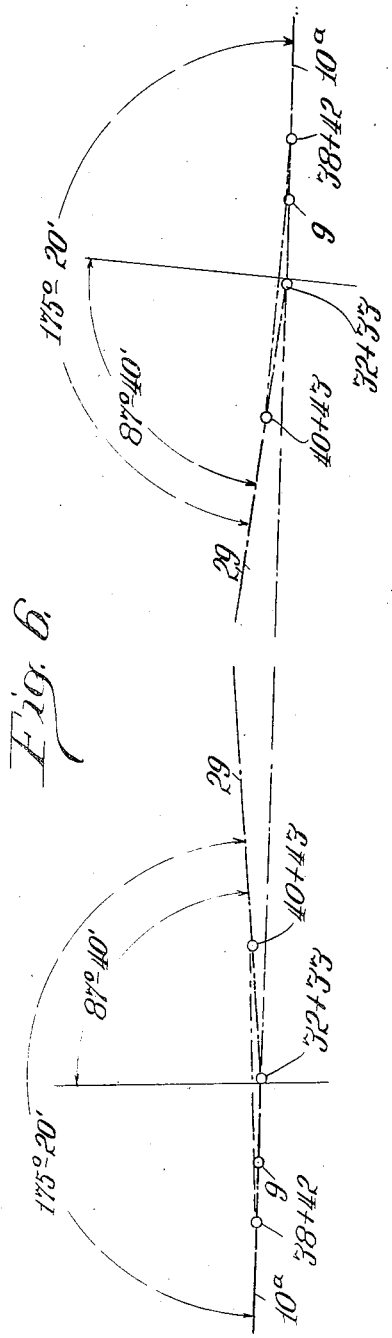
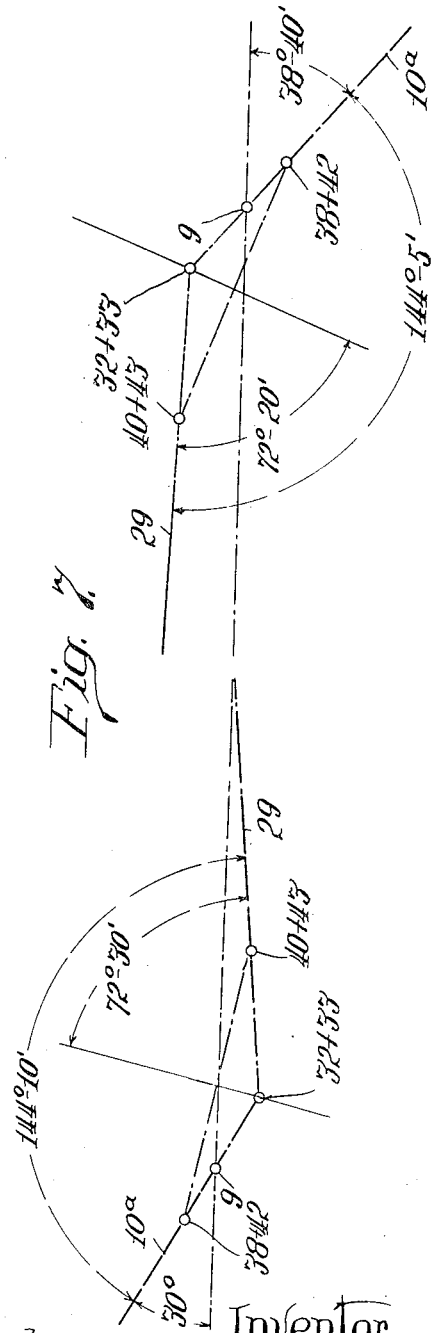
Inventor
Cornelius W. Van Ranst
By Arthur M. Nelson
Attorney Patented Feb. 2, 1932

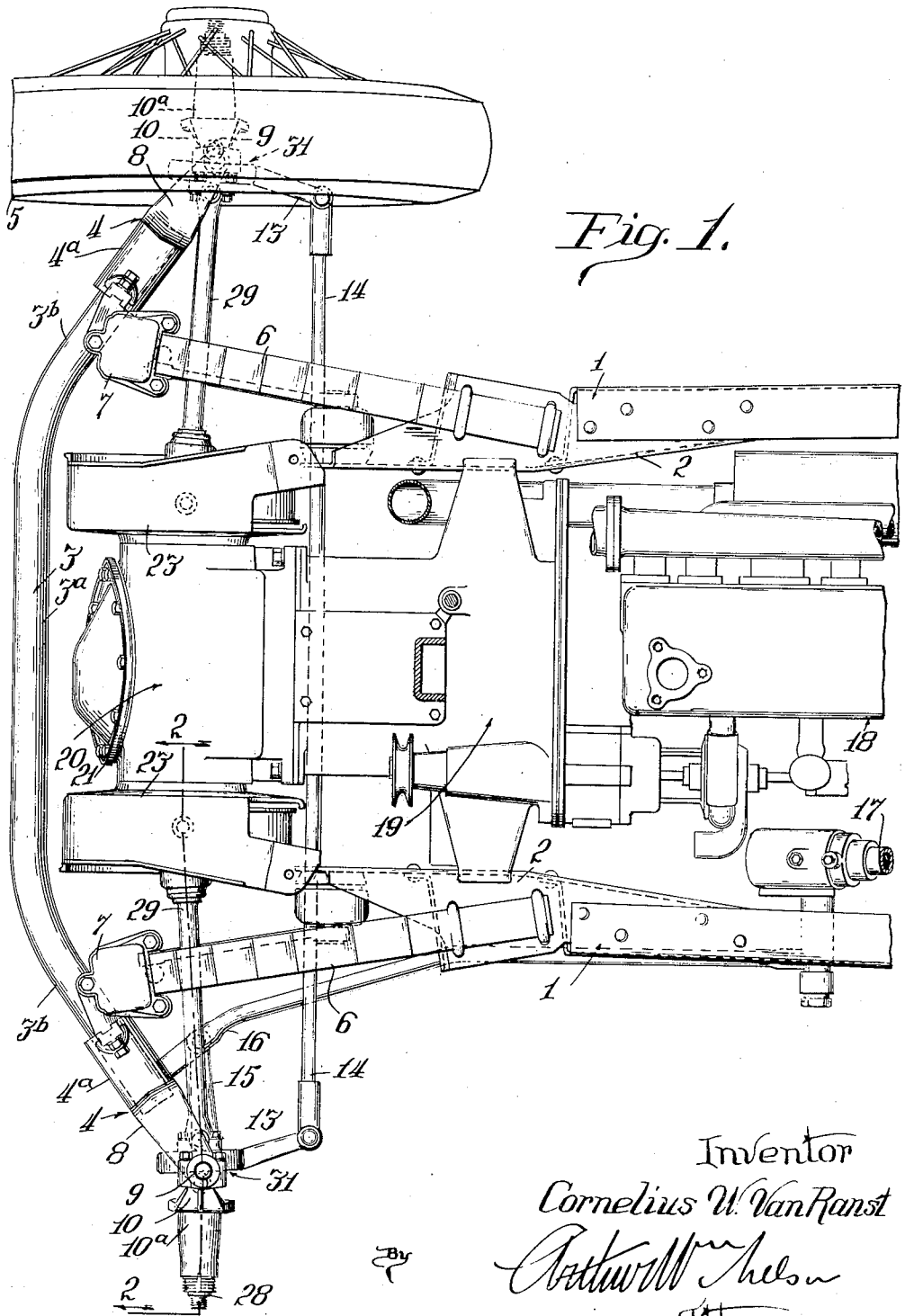

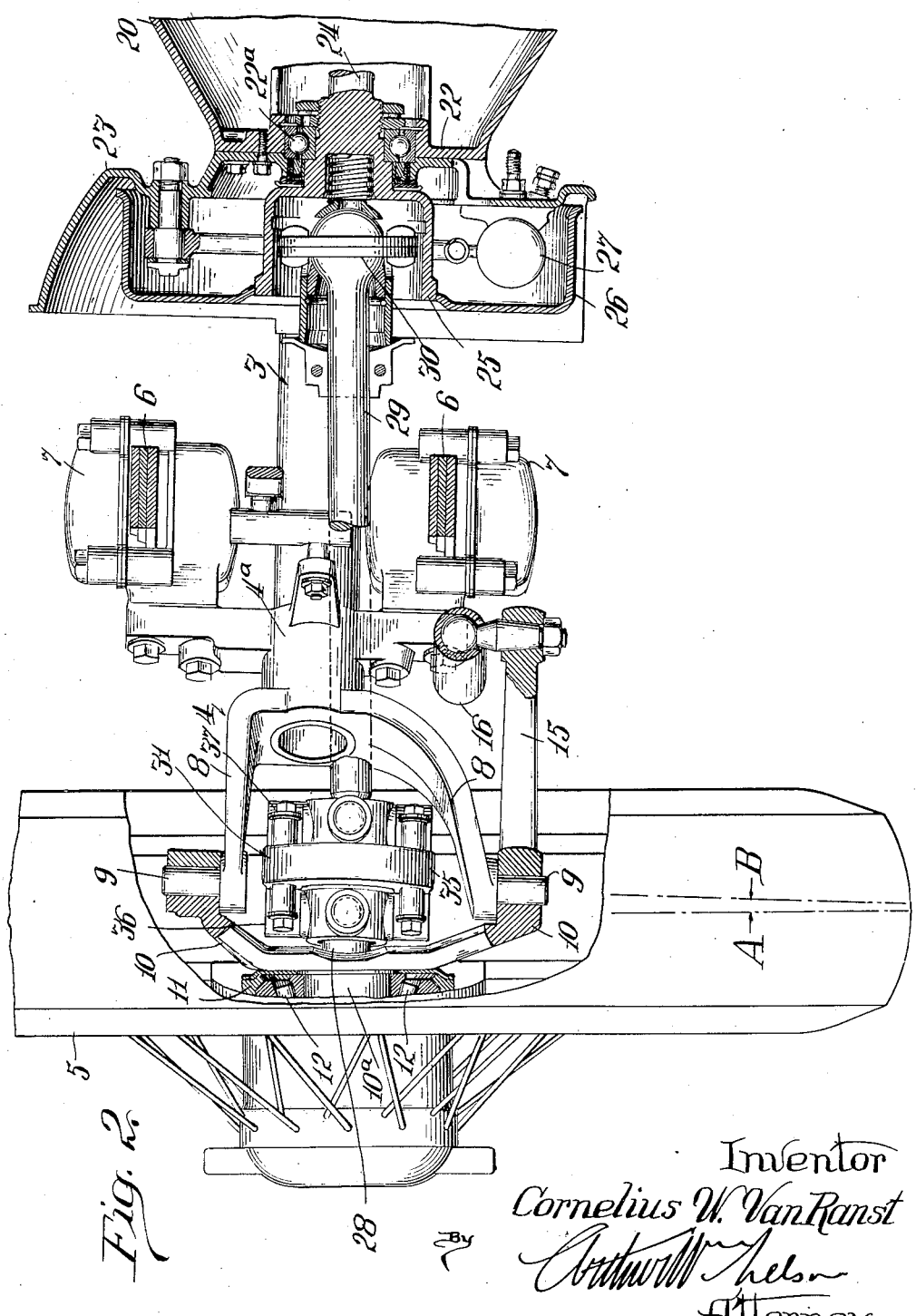

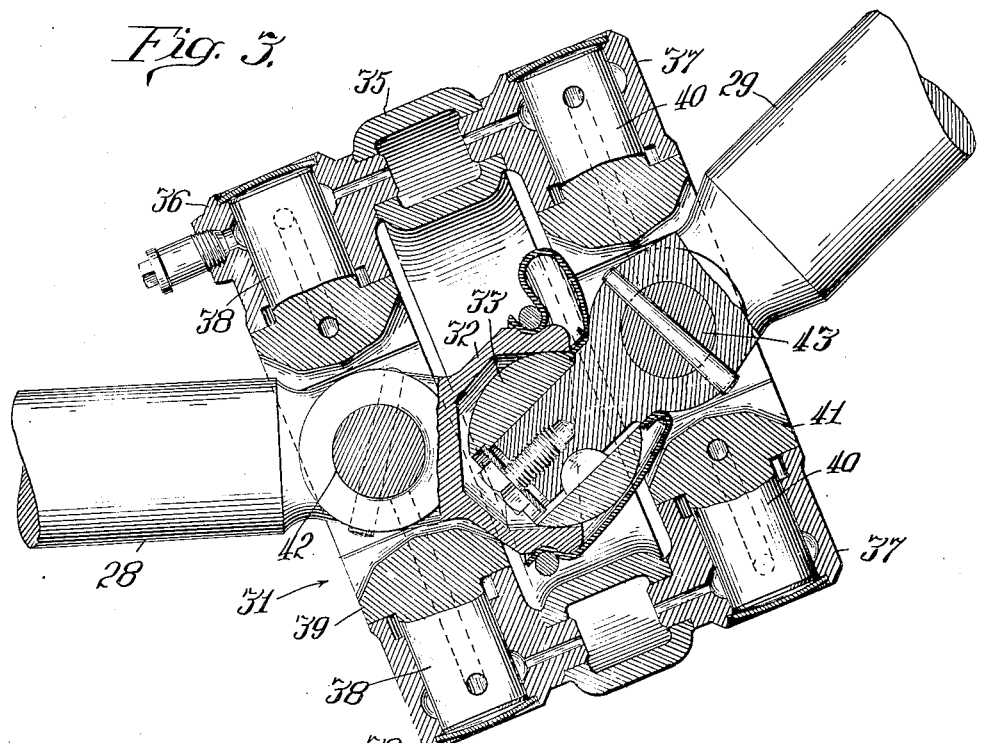
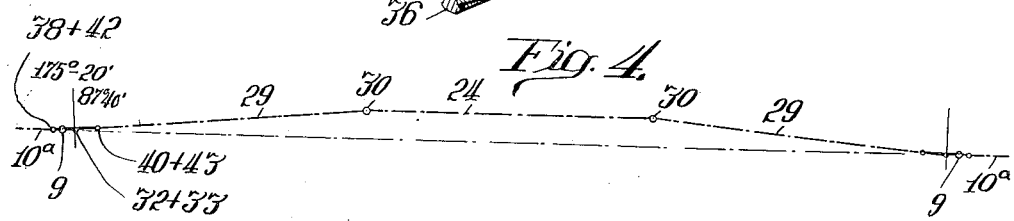
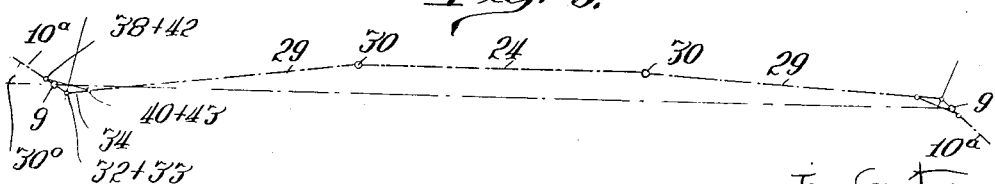

1,843,146

UNITED STATES PATENT OFFICE

CORNELIUS W. VAN RANST, OF AUBURN, INDIANA, ASSIGNOR, BY MESNE ASSIGNMENTS, TO MANNING & CO., OF CHICAGO, ILLINOIS, A CORPORATION OF ILLINOIS

FRONT WHEEL DRIVEN AUTOMOBILE

Application filed May 31, 1929. Serial No. 367,408.

This invention relates to improvements in front wheel driven automobiles and it consists in the matters hereinafter described and more particularly pointed out in the appended claims.

In automobiles of this kind, the front wheels are driven from the differential by means of power transmitting shaft sections, each of which includes a universal joint operatively connecting the wheel driving spindle thereto. Heretofore difficulty was encountered because in turning said wheels as when steering the automobile, the relative angle between the shaft section and its associated wheel spindle became so different from that between the other shaft section and its associated wheel spindle, that wear and looseness rapidly developed in said joints. With such wear and looseness in the universal joints, steering became much harder and a loss of power transmitted occurred together with increased tire wear.

The primary object of the present invention, is to provide a construction overcoming the difficulties above mentioned by so arranging or disposing each power transmitting shaft section that the relative angle between one shaft section and the associated wheel spindle driven thereby will approximate that angle between the other shaft section and the associated wheel spindle driven thereby in turning the wheels as when steering the automobile in making a turn or curve.

Still a further object of the invention is to so arrange the various parts that both universal joints may be caused to operate at approximately the same angle so that the wheels can be turned to a greater angle in steering with less angularity between the parts of said joints, whereby power loss is reduced and the steering is made easier and the automobile may be better controlled while in actual use.

These objects of the invention, together with other, as well as the many advantages thereof, will more fully appear as I proceed with my specification.

In the drawings:—

Fig. 1 is a top plan view of the front end part of a front wheel driven automobile embodying my invention with such parts as the hood and radiator and one front wheel omitted to more fully show the salient features of the invention.

Fig. 2 is a transverse vertical sectional view through the same on an enlarged scale as taken on the line 2—2 of Fig. 1.

Fig. 3 is a detail view illustrating a longitudinal section through a universal joint employed in my improved construction and which will be more fully referred to as I proceed with my specification.

Fig. 4 is a diagrammatic view illustrating the relative angular position of the several parts as when the two front wheels are in their normal driving position.

Fig. 5 is a view similar to Fig. 4 with the parts in the position they assume as when making a right hand turn.

Fig. 6 is a view on an enlarged scale of the end parts of Fig. 4.

Fig. 7 is a view on an enlarged scale of the end parts of Fig. 5.

Referring now in detail to that embodiment of the invention illustrated in the accompanying drawings:—1—1 indicates the front end portions of the side frame members of the chassis of an automobile preferably made of channel stock and operatively connected together at longitudinally spaced points by cross bars not shown, in the manner well known in automobiles. Fixed to the front end of each side frame member is an extension member 2 of channel like cross section with its flanges facing outwardly.

3 indicates as a whole the front axle of the automobile which is preferably though not necessarily made of tubular stock. Said axle includes a mid portion $3^a$ disposed transversely with respect to the automobile, and rearwardly inclined or deflected end portions $3^b$—$3^b$. To each end portion of the axle is fixed the body $4^a$ of a yoke 4 to which is operatively connected an associated front wheel 5 as will later appear.

6—6 indicates the springs which operatively connect the side frame members 1—1 with the axle 3. Said springs are arranged in pairs each comprising top and bottom stacks of leaves and the rear ends of the stacks of one pair of springs are clamped to an associated extension 2 while the front end of the main leaf of each stack is operatively engaged in a housing 7 supported on the top and bottom sides of the body of an associated yoke 4. The springs 6—6 do not extend parallel with the side frame members as is usually the custom in automobiles but said springs diverge outwardly from said extension 2 toward the housings 7 as best shown in Fig. 1.

Each yoke 4 includes in connection with the body 4ᵃ, a pair of vertically spaced top and bottom yoke arms 8—8, the median line of which forms a continuation of the like line of the axle part 3ᵇ. The yoke arms include top and bottom spindle studs 9—9 with which like yoke arms 10—10 of the tubular non-rotative axle 10ᵃ are operatively engaged as best shown in Fig. 2. Journalled on said tubular axle is the hub 11 of a wheel 5 as by means of antifriction bearings 12. It is pointed out that the tubular axle 10ᵃ, is not truly horizontal but extends slightly downwardly to give the desired angular pitch to the wheel 5 mounted thereon. Said wheel is preferably a wire wheel and the plane of the spindle studs 9—9 is offset but a slight distance inwardly fom the plane of the road engaging tread of the tire on said wheel as best indicated by the comparison lines A—B respectively in Fig. 2. By means of the construction described, the wheels 5—5 are capable of a steering turning movement about the vertical axis as provided by the studs 9.

Made integral with the bottom yoke arm 10 of each tubular axle 10ᵃ is a substantially rearwardly extending steering knuckle arm 13 and both of said knuckle arms are operatively connected together by a drag rod or link 14. Made integral with the bottom arm 10 of the tubular axle 10ᵃ associated with the left hand wheel 5, is an inwardly extending knuckle arm 15 to which the front end of a steering thrust rod 16 is connected in the usual manner. The rear end of this thrust rod is operatively connected to a steering post 17 in the manner found in automobiles. 18 indicates as a whole, the engine of the automobile the rear end of which is operatively supported by one of the cross bars connecting the side frame members together as before mentioned. Secured to the front end of the engine is the transmission gearing housing 19 enclosing the usual change speed gearing which is operatively connected with the crank shaft of the engine. Said housing has laterally extending legs which engage upon and are secured to the side frame extension members 2—2 as best shown in Fig. 1.

On the front end of said transmission housing and just to the rear of the intermediate transverse portion of the main axle 3 is secured a casing 20 containing the differential gearing. Said casing includes a removable cover plate 21 at the front and a wall 22 at each end thereof to which is secured a brake drum housing 23.

Journalled in suitable bearings 22ᵃ in each end wall 22 of the differential casing is a transversely disposed, horizontal shaft 24, each operatively connected to the differential gearing (not shown) within the casing 20. The outer end of each shaft 24 is formed to provide a substantially bell shaped head or cup 25 to which is secured a brake drum 26 disposed within the housing 23. On that wall of said housing secured to the associated end wall 22 of the differential casing is mounted suitable mechanism 27 for actuating the usual shoes cooperating with the brake drum. As shown in Fig. 2 such mechanism is of the hydraulically actuated type but as it does not in itself form a particular part of the present invention, it is only illustrated and mentioned herein generally.

Within each tubular wheel axle and operatively connected to the wheel hub 11 so as to drive the same is a stud axle or spindle 28. Between each wheel driving spindle 28 and shaft 24 is a power transmitting shaft 29 for operatively driving said spindle. As best shown in Figs. 2 and 4 when viewed from above, each shaft 29 is inclined or pitched rearwardly at its outer end to be operatively connected to its associated wheel driving spindle 28, it being pointed out that the axial plane of said wheel driving spindles is disposed longitudinally to the rear of that of the shaft 24.

The inner end of each power transmitting shaft 29 is operatively connected by a universal joint 30 to the bell shaped head of the axle shaft 24 and this joint so engages said head as to permit a limited slip or endwise movement between said shaft and head. The outer end of each power transmitting shaft 29 is operatively connected to the associated spindle 28 by a universal joint indicated as a whole at 31 in Fig. 2 and more fully illustrated in Fig. 3. As best shown in said last mentioned figure, the inner end of the wheel driving spindle 28 is formed as a socket 32 to receive a ball shaped head 33 on the outer end of the power transmitting shaft 29 to provide the main pivotal axis of the joint as a whole. Said joint includes a central hollow-ring 35 and pairs of aligned bosses 36 and 37 respectively fixed to each end thereof. Journalled in the pair of bosses 36 and 37 are the studs 38 of a hollow rectangular yoke 41.

The inner end of each spindle 28 adjacent to socket 32 is formed to have secured therein a cross pin 42 disposed at right angle to the axis of, but arranged in the plane of the studs 38 and bears at its end in the yoke 39. The outer end of the shaft section 29 has a like pin 43 disposed at a right angle to the axis of, but arranged in the plane of the studs 40 and bears at its ends in the yoke 41. The construction described provides a double pivot or duplex universal joint which is indeed flexible in its nature and is capable of transmitting power at greater relative shaft angles without loss.

In Figs. 4 and 6 I have illustrated diagrammatically the positions of the several parts of the automobile before described when the wheel spindles 28—28 are in a position parallel with the central portion 3ª of the axle 3 and the automobile is travelling straight ahead and in Figs. 5 and 7 I have illustrated the several parts as when the automobile is making a right hand turn.

In said figures I have indicated the several pivotal joints by the reference numbers of parts making up the same and it will be noticed from Fig. 4 that the pivotal axis between the axle 10ª and yoke 4, as formed by the spindle studs 9—9 is disposed inside the pivotal axis as provided by the studs 38 and pin 42. With the wheel driving spindle disposed parallel with the mid portion 3ª of the axle, the relative smallest angle between said spindle and the shaft 29 is approximately 175° 20′ as shown in Fig. 6 and the angle between the center line of the universal joint as formed by the ball and socket 32—33 respectively and said shaft 29 is about 87° 40′, which is about one half of that between said spindle and shaft.

Now assume that the wheels have been turned about the studs 9—9 to make a right hand turn wherein the spindle of the left wheel is to assume a position at about 30° from its normal position and the wheel thereon will travel on the outside of the curve or turn being made. It is of course apparent that the spindle of the right hand wheel has to be turned into a greater angle so as to be radial with respect to the axis of the arc that the left hand wheel must take and which angular position is about 38° 40′. This difference in degree is provided through the action of the drag link 14.

As the spindle 28 of the left wheel swings about the axis formed by the studs 9—9 from its normal position toward the front of the automobile, the main pivot 32—33 of the joint is thrown slightly rearwardly, changing the angle of the shaft 29 so that the smallest angle between said spindle and shaft, measuring in the direction of the swing of the spindle approximates 144° 10′ and the angle of the center line of the main pivot of the joint will approximate about 72° 30′ which is substantially one half of that between the spindle and shaft, the latter angle representing the angle through which the universal joint must transmit power from the shaft 29 to the spindle 28.

Now passing to the parts associated with the right hand wheel, it is apparent that the spindle 28 thereof is swung through a greater angle, because of the inclination of the knuckle arms 13 which as before stated are connected together by the drag link or rod 14. When the left hand wheel spindle is turned 30° to the front, the right hand spindle is turned to a greater angle so as to meet the angle line of the left hand spindle to provide that imaginary axis for the turn or curve to be made. Such an angle of the right hand spindle approximates 38° 40′ and this throws the main axis 32—33 of the universal joint forwardly, thus changing the angle of the associated shaft section 29 by throwing the axis 40 and 43 forwardly so that the normal angular position of said shaft is changed to that extent approximating the difference in angular movement between the two spindles which approximate about 8° 40′. Thus measuring in the direction of the swing of the right hand wheel spindle to the rear of its associated shaft 29 we find an angle of 144° 5′ which is substantially the same as that (144° 10′) between the left hand spindle and its associated shaft 29 so that they are approximately the same. In this respect, it is pointed out that the center line of the right hand universal joint, as formed by the ball and socket 32—33 and measuring in the direction of the swing of the spindle approximates 72° 20′, which is substantially the same as that between the corresponding center line of the left hand joint and the associated shaft.

Thus even though the angles of the right and left hand wheel spindles differ by about 8° 40′ the driving angles of the universal joints remain substantially the same, the difference being so minute as to have no effect upon the equal transmission of driving power between the wheels.

By means of the improved construction described driving power is equally distributed to both wheels irrespective of their angular position in making a curve and the wheels can be turned to greater angles, thereby sharper turns can be made, making it easier to manipulate the long wheel base automobile into and out of a small parking space. Again the universal joints are subjected to equal driving strains so that no unequal wear develops in them and steering of the car requires less effort so that it can always be maintained under control.

While in describing my invention, I have referred in detail to the form, arrangement and construction of the various parts thereof, the same is to be considered merely as illustrative so that I do not wish to be limited thereto except as may be pointed out in the appended claims.

I claim as my invention:—

1. In a front wheel driven automobile, an axle having a transversely disposed mid portion and inclined end portions, a wheel mounted on the extremity of each inclined end portion for a steering turning movement, a spindle for each wheel for driving the same and normally disposed parallel with the mid portion of the axle but spaced longitudinally therefrom, a differential including driven shafts disposed parallel with the mid portion of the axle and located in a plane between those of said mid portion and said spindles respectively and means operatively connecting said spindles and said differential shafts.

2. In a front wheel driven automobile, an axle having a transversely disposed mid portion and inclined end portions, a wheel mounted on the extremity of each inclined end portion for a steering turning movement, a spindle for each wheel for driving the same and normally disposed parallel with the mid portion of the axle but spaced longitudinally therefrom, a differential including driven shafts disposed parallel with the mid portion of the axle and located in a plane between those of said mid portion and said spindles respectively and means including universal joints connecting each spindle with an associated differential shaft and formed to permit a limited endwise movement thereof in the turning steering movement of the wheels.

3. In a front driven automobile, an axle having an end portion inclined rearwardly with respect to its mid portion, a yoke on said end portion, a tubular wheel axle pivoted on said yoke so as to turn about a vertical axis, a wheel driving spindle disposed in each tubular wheel axle, a differential including a shaft disposed to the rear of said mid portion of the first named axle, a power transmitting shaft operatively connected at one end to said spindle and inclined inwardly and forwardly at its other end and means connecting said last mentioned end of the power transmitting shaft with said differential shaft.

In testimony whereof, I have hereunto set my hand, this 28 day of May, 1929.

CORNELIUS W. VAN RANST.